United States Patent [19]

Reinheimer et al.

[11] 4,329,014
[45] May 11, 1982

[54] INCIDENT LIGHT ILLUMINATION INSTRUMENT FOR SELECTIVE LIGHT AND DARK FIELD ILLUMINATION

[75] Inventors: Günter Reinheimer, Biebertal; Norbert Gaul, Solms-Oberbiel, both of Fed. Rep. of Germany

[73] Assignee: Ernst Leitz Wetzlar GmbH, Wetzlar, Fed. Rep. of Germany

[21] Appl. No.: 159,192

[22] Filed: Jun. 13, 1980

[30] Foreign Application Priority Data

Jun. 15, 1979 [DE] Fed. Rep. of Germany ... 7917232[9]

[51] Int. Cl.³ .................. G02B 21/10; B02B 7/00
[52] U.S. Cl. ........................ 350/89; 350/17; 350/266; 350/91
[58] Field of Search ............... 350/12, 13, 17, 89, 350/91, 266

[56] References Cited

U.S. PATENT DOCUMENTS 3,783,191  1/1974  Sugimoto et al. .............. 350/8
3,930,713  1/1976  Stankewitz et al. ............ 350/91
4,127,318  11/1978  Determann et al. ............. 350/89

*Primary Examiner*—Jon W. Henry
*Attorney, Agent, or Firm*—Wells & Wells

[57] ABSTRACT

An incident light illumination apparatus for generating light and dark field illumination along an optical axis. The illumination apparatus is coupled to a stage arm of a microscope and a microscope tube is coupled to the illumination apparatus.

An illumination stub (7) is located in the illumination apparatus along the optical axis between a light source (8) and an optical deflecting element (11). An aperture (13) passes through the stub from side-to-side for the interchangeable insertion of an insertion module (14,15). This insertion module contains at least two functional groups (I,II; III,II) which can be sequentially placed into the optical axis (9) and the functional groups consist of light attenuating (25) and/or light bounding (19,20,23,24,27) optical components, and additional means (28,29) for pivoting a center stop (30) into the optical axis (9).

10 Claims, 6 Drawing Figures

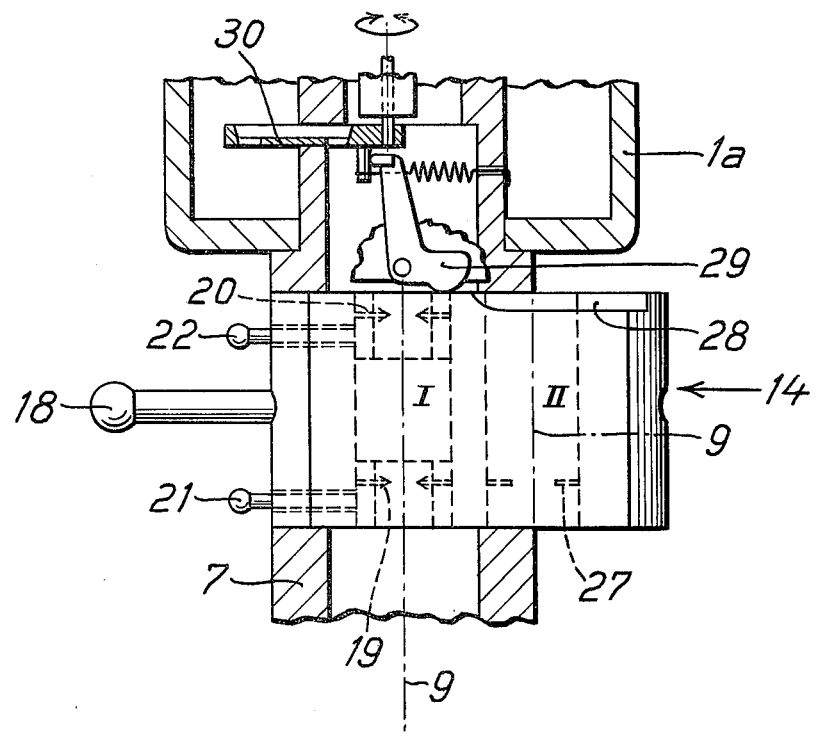

INCIDENT LIGHT ILLUMINATION INSTRUMENT FOR SELECTIVE LIGHT AND DARK FIELD ILLUMINATION

CROSS REFERENCE TO RELATED APPLICATION

Applicants claim priority under 35 USC 119 for application G 79 17 232.0 filed June 15, 1979 in the Patent Office of the Federal Republic of Germany.

BACKGROUND OF THE INVENTION

The field of the invention is optics, systems and elements having lens spacing structures with a dark field stage and the present invention is particularly concerned with an incident light illuminating instrument of modular design for light and dark field illumination.

The state of the art of incident light illumination instruments for selective light and dark field illumination may be ascertained by reference to U.S. Pat. No. 3,930,713, and this disclosure is incorporated herein to show the application to a microscope.

Incident light illuminators having fixed apertures and luminous field stops are known, which are preferably used for routine testing in the semiconductor industry. Furthermore, in research and development, there are incident light illuminators with iris apertures and luminous field stops as light-dark field devices for stringent requirements.

The prior art incident light illuminators, however, suffer from the drawback that for instance when passing from light field to dark field illumination, the user must carry out several manual operations, for instance opening the luminous field stop, adjusting the aperture stop and inserting the center stop. When one switches from the dark to the light field, these manual operations, which are time-consuming and prone to operator errors, must be carried out in the reverse order. Constant and undesired accessory operations result at a cost and in particular for a continuous microscope testing of routine objects, etc.

SUMMARY OF THE INVENTION

Having in mind the limitations of the prior art it is an object of the present invention to provide incident light illumination which permits a rapid switch over free from operator errors and a simple manual change from one type of illumination to the other.

This object is achieved according to the present invention for an incident light illumination instrument by providing an aperture in that part of an illumination stub located between a light source and an optical deflecting component for interchangeably introducing an insertion module containing at least two functional subassemblies sequentially insertable into the path of the beam and consisting of optical light attenuating and/or light bounding components. Means are also provided for inserting a center stop into the beam. The beam bounding optical components may be fixed or may be size varying stops and the light attenuating optical components may be neutral density filters with fixed or variable coefficients of light attenuation. Appropriately, the insertion module used to implement a light field illumination beam is inserted into the aperture so that the particular functional sub-assembly is in the operative position which contains two light field stops, preferably with insertion of a pivoting neutral density filter. Advantageously the insertion module for implementing a dark field illumination beam is inserted into the aperture so that the functional sub-assembly is in the operative position which comprises both a fixed dark field stop and a guide groove engaged by a guide pin mounted in the illumination stub and joining in articulating manner by a linkage rod to a center stop so that the center stop is positioned in the central area of the illumination beam.

BRIEF DESCRIPTION OF THE DRAWINGS

Two embodiments of the present invention are shown schematically in the appended drawing wherein:

FIG. 4c is a top plan view of FIG. 4b showing the articulating lever connection between guide pin 29 and center stop 30.

DESCRIPTION OF THE PREFERRED EMBODIMENTS

Figure 1:
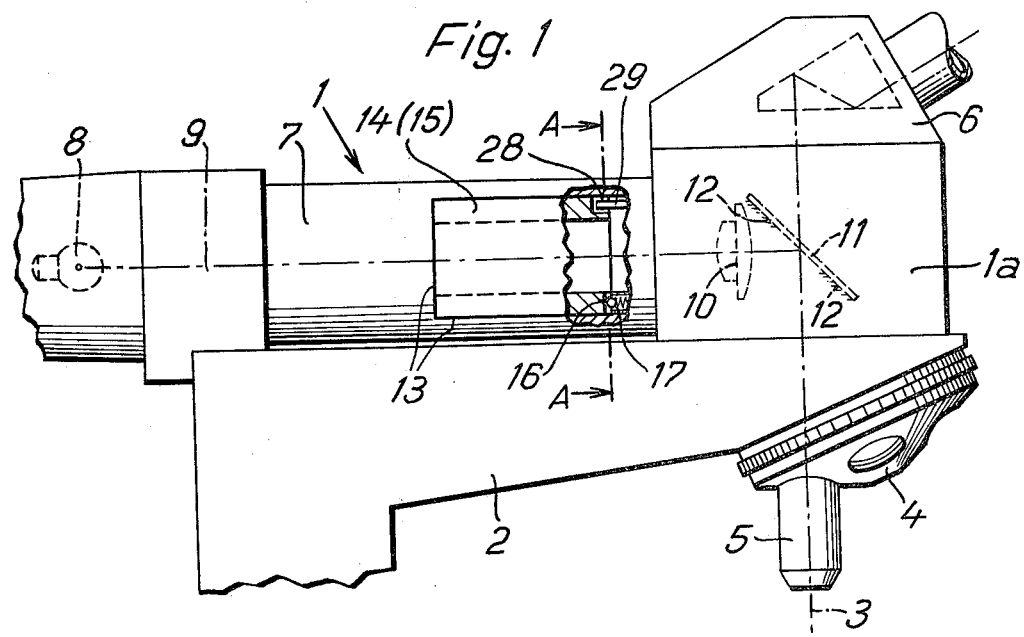
FIG. 1 shows an incident light illumination device mounted on a microscope stage having a binocular tube housing attached.

With particular reference to FIG. 1, an incident light illumination apparatus 1 having a housing 1a is mounted on a microscope stage or saddle bracket 2 comprising at its projecting end an objective turret 4 with an objective 5. A binocular tube housing 6 is mounted on the incident light illumination apparatus 1. The axis of the microscope imaging beam is designated by reference numeral 3. The optical or mechanical coupling means permitting precise centering and adjustment of the three microscope modules 2, 1 and 6 are conventional.

A light source 8 is provided in the incident light illumination apparatus 1 from which an illuminating beam, represented by its optical axis 9, passes through the illuminating stub 7 and optics 10 and is incident on the 50/50 beam splitter 11 which is arranged at an angle of 45° to axes 3 and 9. The outer ring 12 of beam splitter 11 is fully specular.

Figure 2:
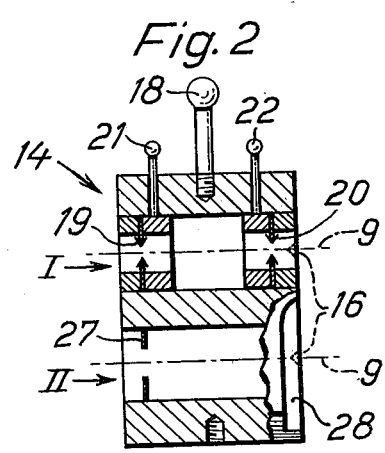
FIG. 2 shows in cross-section an insertion module of a first illustrative embodiment.
Figure 3:
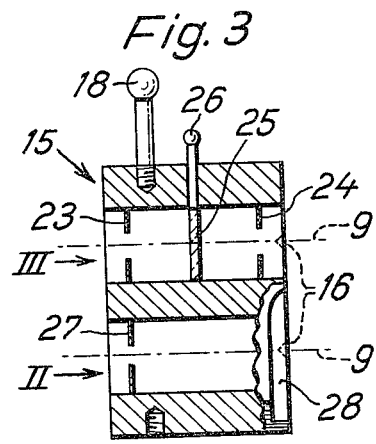
FIG. 3 shows in cross-section an insertion module of a second illustrative embodiment.

The illumination stub 7 comprises an aperture 13 which preferably passes entirely through it from side-to-side to allow insertion of the insertion modules 14 and 15 respectively in alternating manner. The modules 14, 15 are shown in FIGS. 2 and 3. The insertion modules 14,15 are preferably each of integral design and each consists of at least two functional sub-assemblies I,II; III,II. In order to position the particular functional sub-assemblies I through III in central manner in the illumination beam (optical axis) 9, notches 16 are provided at the module housings 14,15 with indexing means 17 located at the lower part of aperture 13 within the illumination stub 7. Using a handle 18, it is possible to move by one manual action the modules 14,15 into the particular desired operative position, and when the aperture 13 passes transversely through the stub 7, the handle 18 is appropriately mounted in detachable manner to the module housing and can be remounted on the opposite side of the module housing. Such detachable mounts comprise, for example, threads at the base of handle 18 and matching threaded inserts on both sides of the module housing. FIG. 2 shows an insertion module 14 consisting of an integral housing and containing two functional sub-assemblies I and II. Functional sub-assembly I contains an aperture stop 19 and a luminous field stop 20. Each is embodied as an iris stop and is located in a central bore crossed by the illuminating beam 9, these stops being variable in magnitude when the associated levers 21 and 22 are activated, respectively. When this functional sub-assembly I is moved into operative position, a light field illuminating beam is achieved.

The functional sub-assembly for the light field illumination can also consist of stops of fixed size in lieu of the iris stops 19 and 20. This is shown in FIG. 3 with particular reference to sub-assembly III. In this system of fixed stops, a neutral density filter 25 is appropriately provided between the aperture stop 23 and the luminous field stop 24. The filter 25 pivots in or out of the beam 9 by means of a lever 26. In lieu of a conventional filter with a constant light attenuation coefficient, it is also possible to use a filter with a variably adjusted light attenuation coefficient.

To implement the dark field illuminating beam, the module 14 or 15 is inserted into aperture 13 until the functional sub-assembly II, which is identical in both FIGS. 2 and 3, has reached its operative position. In its central part the functional sub-assembly II consists of a bore crossed by the illuminating beam, see its axis 9, and of a fixed aperture stop 27. A guide groove 28 is located at the upper longitudinal side of the insertion module 14 or 15 along the entire length of the functional sub-assembly II, and is engaged by guide pin 29 so that a guide linkage means connected to it in articulating manner will pivot a center stop 30, shown in FIGS. 4a and 4b, accurately into the center of the middle region of the illuminating beam. The center stop 30 and the stop 27 shown in FIGS. 2 and 3 cooperate functionally.

Figure 4A:
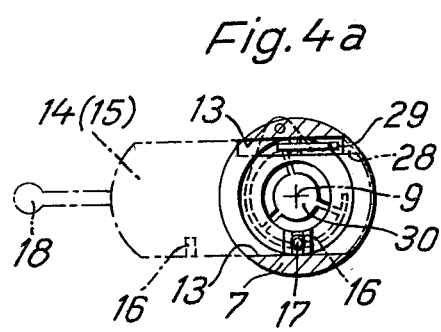
FIG. 4a is a view in partial cross section along line A—A of FIG. 1 with inserted module and center stop in the operative position.
Figure 4B:
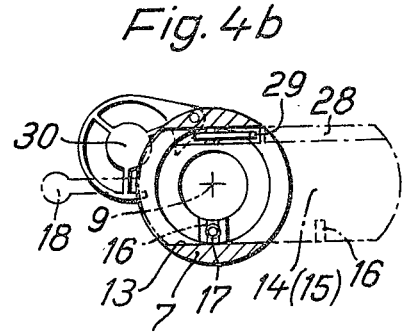
FIG. 4b is a view in partial cross section showing the position of the center stop after it is swung out of the optical axis of the incident light illuminator.

FIGS. 4a and 4b show the switch over of the different kinds of illumination. FIG. 4a shows the implementation of the dark field illuminating beam, i.e., when the functional sub-assembly II and the center stop 30 are in the operative position.

If now the insertion module 14 or 15 is displaced until one of the functional sub-assemblies I or III is in the operative position, the guide pin 29 leaves the guide groove 28 during the insertion of the module 14 or 15. The guide groove 28 is present only as far as the end of the sub-assembly II, where it flares, so that the center stop 30 automatically pivots out of the region of the illuminating beam. This end position is shown in FIG. 4a. There is an articulating lever connection between the guide pin 29 and the center stop 30 as shown in FIG. 4c.

Even though the figures merely show modules consisting of two functional sub-assemblies, three or more sub-assemblies can also be used in a linear manner as a slide means within the scope of the present invention. The variations concerning the apparatus with optical components of the various functional sub-assemblies result from the fact that fixed and/or variable aperture and/or luminous field stops are provided in combination with neutral density filters. In principle the only requirement is that both types of illumination (light and dark fields) are sequentially implemented by a rapid change.

It is furthermore possible to provide another insertion aperture in the illumination stub 7 between the light source 8 and the aperture 13 wherein a slider of modular design is introduced. This slider could contain a polarizing filter and behind, as seen in the direction of the light beam, a quarter wave plate. By means of this accessory an interference contrast means is devised in the path of the light field illumination. In addition, a full wave plate for insertion and retraction can also be provided between this insertion aperture and the filter, both the full-wave plate and the insertion aperture being omitted from the figures.

Another embodiment of the incident light illumination apparatus of the present invention contemplated is provided in this manner with polarizing-optical components which further comprise a displaceably mounted analyzer between the deflecting mirror 11 and the binocular tube 6.

We claim:

1. An incident light illumination apparatus having a housing and a light source for generating dark and light field illumination along an optical axis through said housing comprising:
    (a) optical deflecting means (11) located along said optical axis;
    (b) said housing including an illumination stub (7) located between said light source (8) and said optical deflecting means (11) along said optical axis;
    (c) an aperture (13) passing transversely through said illumination stub (7);
    (d) an insertion module (14) having at least first (I) and second (II) functional groups adapted for interchangeable insertion into said aperture;
    (e) said first functional group containing light bounding optical elements (19,20) and said second functional group containing at least one light bounding optical element (27); and
    (f) a center stop (30) and means (28,29) connecting said second functional group and said center stop for pivoting said center stop into said optical axis.

2. The apparatus of claim 1, wherein said light bounding components comprise fixed stops (23,24,27).

3. The apparatus of claim 1, wherein said light bounding components comprise size variable stops (19,20).

4. An incident light illumination apparatus having a housing and a light source for generating dark and light field illumination along an optical axis through said housing comprising:
    (a) optical deflecting means (11) located along said optical axis;
    (b) said housing including an illumination stub (7) located between said light source (8) and said optical deflecting means (11) along said optical axis;
    (c) an aperture (13) passing transversely through said illumination stub (7);
    (d) an insertion module (15) having at least first (III) and second (II) functional groups adapted for interchangeable insertion into said aperture;
    (e) said first functional group containing light attenuating optical element (25) and light bounding optical elements (23,24) and said second functional groups containing at least one light bounding optical element (27); and
    (f) a center stop (30) and means (28,29) connecting said second functional group and said center stop for pivoting said center stop into said optical axis.

5. The apparatus of claim 4, wherein said light bounding components comprise fixed stops (23,24,27).

6. The apparatus of claim 4, wherein said light bounding components comprise size variable stops (19,20).

7. The apparatus of claim 4, wherein said light attenuating optical components comprise neutral density filters (25) with constant light attenuation coefficients.

8. The apparatus of claim 4, wherein said light attenuating optical components comprise neutral density filters (25) with variable light attenuation coefficients.

9. An incident light illumination apparatus having a housing and a light source for generating dark and light field illumination along an optical axis through said housing comprising:
(a) optical deflecting means (11) located along said optical axis;
(b) said housing including an illumination stub (7) located between said light source (8) and said optical deflecting means (11) along said optical axis;
(c) an aperture (13) passing transversely through said illumination stub (7);
(d) an insertion module (14) having at least first (I) and second (II) functional groups adapted for interchangeable insertion into said aperture;
(e) said first functional group containing light bounding optical elements (19,20) and said second functional group containing at least one light bounding optical element (27); and
(f) a center stop (30), said second functional group (II) having a fixed dark field stop (27) and a guide groove (28), and a guide pin (29) on said illumination stub engaging said guide groove and connected in articulating manner by a guide linkage to said center stop (30) for positioning said center stop in the middle region of said optical axis.

10. An incident light illumination apparatus having a housing and a light source for generating dark and light field illumination along an optical axis through said housing comprising:
(a) optical deflecting means (11) located along said optical axis;
(b) said housing including an illumination stub (7) located between said light source (8) and said optical deflecting means (11) along said optical axis;
(c) an aperture (13) passing transversely through said illumination stub (7);
(d) an insertion module (15) having at least first (III) and second (II) functional groups adapted for interchangeable insertion into said aperture;
(e) said first functional group containing light attenuating optical elements (25) and light bounding optical elements (23,24) and said second functional group containing at least one light bounding element (27); and
(f) a center stop (30), said second functional group (II) having a fixed dark field stop (27) and a guide groove (28), and a guide pin (29) on said illumination stub engaging said guide groove and connected in articulating manner by a guide linkage means to said center stop (30) for positioning said center stop in the middle region of said optical axis.

* * * * *